United States Patent [19]

Iwamoto et al.

[11] Patent Number: 6,104,624
[45] Date of Patent: Aug. 15, 2000

[54] SYSTEM CONNECTING DEVICE

[75] Inventors: Hideo Iwamoto, Tokyo; Takahiko Iida, Okayama, both of Japan

[73] Assignees: Mitsubishi Denki Kabushiki Kaisha, Tokyo; Kake Educational Institution, Okayama, both of Japan

[21] Appl. No.: 09/404,540

[22] Filed: Sep. 24, 1999

[30] Foreign Application Priority Data

Mar. 15, 1999 [JP] Japan .................................. 11-068239

[51] Int. Cl.$^7$ ...................................................... H02M 7/00
[52] U.S. Cl. ................................................ 363/71; 307/82
[58] Field of Search ................................ 307/82; 363/71; 323/906

[56] References Cited

U.S. PATENT DOCUMENTS 4,823,247 4/1989 Tamoto ...................................... 363/16

FOREIGN PATENT DOCUMENTS 7-213072 8/1995 Japan .
10-14244 1/1998 Japan .

OTHER PUBLICATIONS

"Research and Development on Inverter Using Up/Down Type SMR Method" The 48$^{th}$ Meeting In Electric/Information Field held on Oct. 25, 1997, announced by Matsui et al. p. 129.
"Current and Examples of Application to Power Generator Using Sunlight"Power Electronics Guidebook, pp. 76–81 (1999).

*Primary Examiner*—Shawn Riley
*Attorney, Agent, or Firm*—Oblon, Spivak, McClelland, Maier & Neustadt, P.C.

[57] ABSTRACT

Buck-boost type or buck type chopper circuits and transistors are employed as inverters (IV1, IV2) and power synchronizing switches (SW1, SW2), respectively. A PWM signal is applied to transistors of the chopper circuits to convert DC voltage generated by solar cells (DC1, DC2) into positive and negative half-wave AC voltages for an AC power supply (AC1). The inverters (IV1, IV2) output the AC voltages from their AC output terminals on alternate half cycles thereby to cause backflow of power. The power synchronizing switches (SW1, SW2) performs not only the function of transmitting the half-wave AC voltages generated by the inverters (IV1, IV2) to the AC power supply (AC1) in accordance with the AC cycle of the AC power supply (AC1), but also the function of, when one of the inverters is in operation, insulating the other from the AC power supply (AC1). This achieves a DC-AC system connecting device that is capable of establishing a ground for both DC and AC sides only with a few transistors and diodes without a transformer.

16 Claims, 8 Drawing Sheets

SYSTEM CONNECTING DEVICE

BACKGROUND OF THE INVENTION

1. Field of the Invention

The present invention relates to a system connecting device for converting DC power into AC power using an inverter and supplying an AC power supply or an AC load with the AC power.

2. Description of the Background Art

With recent development of power generators using alternate energy such as solar cells and fuel cells, there has been an increasing need to develop a device for connecting such DC power generators to an existing power-frequency electric system thereby to cause backflow of generated DC power to the existing electric system. In the case of the solar cells, for example, since DC power is generated, direct connection with the AC power supply or the AC load is impossible. Then, there has been devised a variety of system connecting devices for converting DC power into AC power using an inverter, and causing backflow of the AC power to the AC power supply or supplying the AC load with the AC power.

FIG. 13 shows a conventional system connecting device SC5 using a solar cell. This system connecting device SC5 comprises a solar cell DC1, a power-frequency AC power supply AC1, and an inverter IV5. Nodes N1 and N2 on positive and negative electrodes of the solar cell DC1, respectively, are connected to the inputs of the inverter IV5, whereas nodes N6 and N7 of the AC power supply AC1 are connected to the outputs of the inverter IV5. From a safety standpoint, the node N7 of the AC power supply AC1 is also connected to ground, bearing a fixed potential, e.g., a ground potential GND.

FIG. 14 shows an example of the structure of the inverter IV5. This inverter IV5 is composed of four insulated gate bipolar transistors (IGBT) IT1 to IT4 and four diodes ID1 to ID4. Both collectors of the transistors IT1 and IT2 are connected to the node N1, and both emitters of the transistors IT3 and IT4 are connected to the node N2. The emitter of the transistor IT1 and the collector of the transistor IT3 are connected in common to the node N7, whereas the emitter of the transistor IT2 and the collector of the transistor IT4 are connected in common to the node N6. The anodes of the diodes ID1 to ID4 are connected to the emitters of the transistors IT1 to IT4, respectively, and the cathodes of the diodes ID1 to ID4 are connected to the collectors of the transistor IT1 to IT4, respectively. Each transistor is connected at its gate to a control signal generator (not shown) to receive a control signal for operation of the inverter (e.g., in synchronization with the control signal, the transistors IT1 and IT4 are on during a first half cycle and the transistors IT2 and IT3 are on during a second half cycle). This type of inverter is generally called a single-phase bridge inverter.

Now, we will describe the operation of the inverter IV5. First, control signals are applied to the gates of the transistors IT1 and IT4 so that both the transistors are brought into conduction. At this time, a potential at the positive electrode of the solar cell DC1 (potential on the node N1) becomes the ground potential GND since the positive electrode is connected via the transistor IT1 and the node N7 to ground. A potential at the negative electrode of the solar cell DC1 (potential on the node N2) is lower than the potential at the positive electrode which is the ground potential GND, by a potential generated by the solar cell DC1. Thus, a potential on the node N6 of the AC power supply AC1 that is connected to the node N2 by the transistor IT4 becomes lower than the ground potential GND.

Then, the application of the control signals to the transistors IT1 and IT4 is stopped, and control signals are applied to the gates of the transistors IT2 and IT3 so that both the transistors are brought into conduction. At this time, the potential at the negative electrode of the solar cell DC1 becomes the ground potential GND since the negative electrode is connected via the transistor IT3 and the node N7 to ground. The potential at the positive electrode of the solar cell DC1 is higher than the potential at the negative electrode which is the ground potential GND, by the potential generated by the solar cell DC1. Thus, the potential on the node N6 of the AC power supply AC1 that is connected to the node N1 by the transistor IT2 becomes higher than the ground potential GND.

Repetitions of such switching operation in predetermined cycles by the control signals permits power conversion from DC to AC. The diodes ID1 to ID4 are provided for the purpose of ensuring a feedback path of current when load current fails to flow from the collector to emitter of each transistor during the transition of the switching.

In the system connecting device SC5 of FIG. 13, the AC power supply AC1 is connected to ground but the solar cell DC1 is not. From a safety standpoint, a node at either one of the electrodes of the solar cell DC1 is preferably connected to ground at a fixed potential (e.g., the node N2 is hereinafter referred to as a node to be grounded). In this case, there is no charge/discharge current in electrostatic capacity which is caused between the ground potential GND and a floating potential when the node is not grounded. This improves electric efficiency of the device.

Grounding of the node N2, however, establishes a ground for both the nodes N6 and N7 when the transistors IT1 and IT4 are brought into conduction. This is dangerous to the AC power supply AC1 and makes it difficult to properly transmit the DC power generated by the solar cell DC1 to the AC power supply AC1 as AC power. From these reasons, the system connecting device SC5 as shown in FIG. 13 is available only for use with a simple system that requires no ground connection of the node N2 and delivers only small output power.

Then, a device configuration permitting grounding of both the nodes N2 and N7 has been developed. FIG. 15 shows such a system connecting device SC6. This system connecting device SC6 further comprises a transformer TR2 in addition to the solar cell DC1, the AC power supply AC1, and the inverter IV5 similar to those of the system connecting device SC5 in FIG. 13. The transformer TR2 disposed between the inverter IV5 and the AC power supply AC1 provides electrical isolation, so that both the solar cell DC1 and the AC power supply AC1 can be grounded.

In FIG. 15, a DC voltage regulator DS1 and a capacitor C4 are further provided between the solar cell DC1 and the inverter IV5. The DC voltage regulator DS1 has the function of outputting a constant voltage even if the output voltage of the solar cell DC1 varies with the conditions of solar irradiation. The capacitor C4 has the function of smoothing out the output of the DC voltage regulator DS1. In general, a voltage inverter connected to a voltage source, such as the inverter IV5, has an optimum conversion ratio of the DC to the AC voltage. Thus, conversion at the other ratios may degrade output characteristics of the inverter or may uneconomically increase current capacitance of semiconductor devices used therein. For efficient operation of the inverter IV5, therefore, it is desirable to supply a constant DC voltage.

The input of the DC voltage regulator DS1 is connected via the nodes N1 and N2 to the positive and negative electrodes of the solar cell DC1 and the output thereof is connected via the nodes N4 and N2 to the input terminals of the inverter IV5. The capacitor C4 is connected at its one end to the node N4 which is one input end of the inverter IV5, and at its other end to the node N2.

As the DC voltage regulator DS1, a chopper circuit is for example employed. There are three types of chopper circuits: buck (step-down) type, boost (step-up) type, and buck-boost (step-up/down) type, from which a boost type chopper circuit as shown in FIG. 16 is employed as the DC voltage regulator DS1. This boost type chopper circuit comprises a reactor L1c, an insulated gate bipolar transistor CT1c, and a diode D1c. One end of the reactor L1c, the emitter of the transistor CT1c, and the cathode of the diode D1c are connected to the nodes N1, N2, and N4, respectively. The other end of the reactor L1c is connected via a node N8 to the corrector of the transistor CT1c and the anode of the diode D1c. The gate of the transistor CT1c is connected to a control signal generator (not shown) to receive a control signal for generation of the DC constant voltage (e.g., a pulse signal having constant cycle and phase).

In this boost type chopper circuit, during the transistor CT1c is on, current flows from the node N1 to N2 and electromagnetic energy is stored in the reactor L1c. With the transistor CT1c off, on the other hand, the electromagnetic energy stored in the reactor L1c is drained to the node N4 and stored as electrostatic energy in the capacitor C4 that is connected to the node N4. Thus, by controlling the control signal applied to the gate of the transistor CT1c, the switching of the transistor CT1c is repeated and the length of time that the transistor CT1c is in the ON state is controlled. This permits a supply of predetermined constant DC voltage to the inverter IV5.

In this system connecting device SC6, both the solar cell DC1 and the AC power supply AC1 can be grounded, but the transformer TR2 which is heavy in weight and large in occupied volume becomes necessary. In addition, the number of elements is increased by the presence of the inverter IV5, and for efficient operation of the inverter IV5, the DC voltage regulator DS1 is necessary. Accordingly, development of the system connecting devices that can resolve these problems is desired.

Japanese Patent Laid-open No. 10-14244 and No. 7-213072, for example, disclose techniques of system connecting devices with no transformer. These techniques are, however, not the solutions to the problems of the circuit shown in FIG. 15 in that the former is the structure in which the AC power supply cannot be grounded and the latter is the structure corresponding to a single-phase three-wire system AC power supply. Further, both techniques employ a single-phase bridge inverter, so that the problem of too many transistors and diodes remains. More specifically, the single-phase bridge inverter requires at least four transistors and four diodes. Besides, the input portion of the bridge is generally connected to a DC voltage regulator such as a boost type chopper circuit and each output terminal thereof is provided with one reactor, which further increases the number of elements.

SUMMARY OF THE INVENTION

A first aspect of the present invention is directed to a system connecting device comprising: first and second DC power supplies each having positive and negative electrodes; an AC power supply having a first end, and a second end which is connected in common to the positive electrode of the first DC power supply and the negative electrode of the second DC power supply and to which a fixed potential is fed, the AC power supply applying an AC voltage of first frequency across the first and second ends thereof; a first chopper circuit for outputting first current which is obtained by chopping second current flowing through the negative electrode of the first DC power supply at a second frequency higher than the first frequency during a first half cycle in which the AC voltage is higher than the fixed potential; a first switch for supplying the first current during at least a period in which the first chopper circuit cuts off the second current in the first half cycle, the first switch stopping the supply during a second half cycle in which the AC voltage is lower than the fixed potential; a second chopper circuit for outputting third current which is obtained by chopping fourth current flowing through the positive electrode of the second DC power supply at a third frequency higher than the first frequency during the second half cycle; and a second switch for supplying the third current during at least a period in which the second chopper circuit cuts off the fourth current in the second half cycle, the second switch stopping the supply during the first half cycle of the AC voltage.

According to a second aspect of the present invention, in the system connecting device of the first aspect, the first chopper circuit includes: a third switch having a first end connected to the negative electrode of the first DC power supply and a second end, the third switch being turned on/off at the second frequency; a first inductor having a first end connected to the second end of the third switch and a second end connected to the positive electrode of the first DC power supply; and a first diode having an anode connected to the second end of the third switch and a cathode connected to the first switch, and the second chopper circuit includes: a fourth switch having a first end connected to the positive electrode of the second DC power supply and a second end, the fourth switch being turned on/off at the third frequency; a second inductor having a first end connected to the second end of the fourth switch and a second end connected to the negative electrode of the second DC power supply; and a second diode having a cathode connected to the second end of the fourth switch and an anode connected to the second switch.

According to a third aspect of the present invention, in the system connecting device of the first aspect, the third switch is turned on/off during the first half cycle, the third switch and the first switch being mutually exclusive; and the fourth switch is turned on/off during the second half cycle, the fourth switch and the second switch being mutually exclusive.

According to a fourth aspect of the present invention, in the system connecting device of the first aspect, the first switch is on during the first half cycle and off during the second half cycle; and the second switch is off during the first half cycle and on during the second half cycle.

A fifth aspect of the present invention is directed to a system connecting device comprising: first and second DC power supplies each having positive and negative electrodes; an AC power supply having a first end, and a second end which is connected in common to the positive electrode of the first DC power supply and the negative electrode of the second DC power supply and to which a fixed potential is fed, the AC power supply applying an AC voltage of first frequency across the first and second ends thereof; a first chopper circuit for outputting first current which is obtained by chopping second current flowing through the negative electrode of the first DC power supply at a second frequency higher than the first frequency during a first half cycle in which the AC voltage is lower than the fixed potential; a first switch for supplying the first current during at least a period in which the first chopper circuit cuts off the second current in the first half cycle, the first switch stopping the supply during a second half cycle in which the AC voltage is higher than the fixed potential; a second chopper circuit for outputting third current which is obtained by chopping fourth current flowing through the positive electrode of the second DC power supply at a third frequency higher than the first frequency during the second half cycle; and a second switch for supplying the third current during at least a period in which the second chopper circuit cuts off the fourth current in the second half cycle, the second switch stopping the supply during the first half cycle of the AC voltage.

According to a sixth aspect of the present invention, in the system connecting device of the fifth aspect, the first chopper circuit includes: a third switch having a first end connected to the negative electrode of the first DC power supply and a second end, the third switch being turned on/off at the second frequency; a first inductor having a first end connected to the second end of the third switch and a second end connected to the first switch; and a first diode having an anode connected to the second end of the third switch and a cathode connected to the positive electrode of the first DC power supply, and the second chopper circuit includes: a fourth switch having a first end connected to the positive electrode of the second DC power supply and a second end, the fourth switch being turned on/off at the third frequency; a second inductor having a first end connected to the second end of the fourth switch and a second end connected to the second switch; and a second diode having a cathode connected to the second end of the fourth switch and an anode connected to the negative electrode of the second DC power supply.

According to a seventh aspect of the present invention, in the system connecting device of the fifth aspect, the first switch is on during the first half cycle and off during the second half cycle; and the second switch is off during the first half cycle and on during the second half cycle.

An eighth aspect of the present invention is directed to a system connecting device comprising: a DC power supply having positive and negative electrodes; an AC power supply having a first end, and a second end which is connected to the negative electrode of the DC power supply and to which a fixed potential is fed, the AC power supply applying an AC voltage of first frequency across the first and second ends thereof; a first chopper circuit for outputting first current which is obtained by chopping second current flowing through the positive electrode of the DC power supply at a second frequency higher than the first frequency during a first half cycle in which the AC voltage is higher than the fixed potential; a first switch for supplying the first current during at least a period in which the first chopper circuit cuts off the second current in the first half cycle, the first switch stopping the supply during a second half cycle in which the AC voltage is lower than the fixed potential; a second chopper circuit for outputting third current which is obtained by chopping the second current at a third frequency higher than the first frequency during the second half cycle; and a second switch for supplying the third current during at least a period in which the second chopper circuit cuts off the second current in the second half cycle, the second switch stopping the supply during the first half cycle of the AC voltage.

According to a ninth aspect of the present invention, in the system connecting device of the eighth aspect, the first chopper circuit includes: a third switch having a first end connected to the positive electrode of the DC power supply and a second end, the third switch being turned on/off at the second frequency; a first inductor having a first end connected to the second end of the third switch and a second end connected to the first switch; and a first diode having a cathode connected to the second end of the third switch and an anode connected to the negative electrode of the DC power supply, and the second chopper circuit includes: a fourth switch having a first end connected to the positive electrode of the DC power supply and a second end, the fourth switch being turned on/off at the third frequency; a second inductor having a first end connected to the second end of the fourth switch and a second end connected to the negative electrode of the DC power supply; and a second diode having a cathode connected to the second end of the fourth switch and an anode connected to the second switch.

According to a tenth aspect of the present invention, in the system connecting device of the eighth aspect, the first chopper circuit includes: a third switch having a first end connected to the positive electrode of the DC power supply and a second end, the third switch being turned on/off at the second frequency; a first diode having an anode, and a cathode connected to the first switch; and a transformer including primary and secondary winding, the primary winding having a first end connected to the second end of the third switch and a second end connected to the negative electrode of the DC power supply, the secondary winding having a first end connected to the anode of the first diode and a second end connected to the negative electrode of the DC power supply, and the second chopper circuit includes: a fourth switch having a first end connected to the positive electrode of the DC power supply and a second end, the fourth switch being turned on/off at the third frequency; an inductor having a first end connected to the second end of the fourth switch and a second end connected to the negative electrode of the DC power supply; and a second diode having a cathode connected to the second end of the fourth switch and an anode connected to the second switch.

According to an eleventh aspect of the present invention, in the system connecting device of the tenth aspect, the third switch is turned on/off during the first half cycle, the third switch and the first switch being mutually exclusive; and the fourth switch is turned on/off during the second half cycle, the fourth switch and the second switch being mutually exclusive.

According to a twelfth aspect of the present invention, in the system connecting device of the eighth aspect, the first switch is on during the first half cycle and off during the second half cycle; and the second switch is off during the first half cycle and on during the second half cycle.

In the system connecting device of the first aspect, the fixed potential is fed in common to the first and second DC power supplies and the AC power supply. This improves stability and safety in the entire system connecting device. Further, the nonuse of a transformer prevents increases in weight and occupied volume of the entire system connecting device. The device further improves its power efficiency since there is no charge/discharge current in electrostatic capacity which is caused between the fixed potential and a floating potential when the fixed potential is not applied.

The system connecting device of the second aspect reduces the numbers of switches and diodes. This stabilizes the supply of the outputs of the first and second DC power supplies to the AC power supply.

In the system connecting device of the third aspect, the first and second chopper circuits output positive and negative half-wave AC voltages, respectively, on alternate half cycles, whereby the AC power supply is supplied with the AC power.

The system connecting device of the fourth aspect reduces the number of times that the first and second switches are turned on/off, as well as having the effect of the device of the third aspect. This reduces power loss due to the switching and facilitates the control of the first and second switches.

The system connecting device of the fifth aspect achieves the same effect of the device of the first aspect.

The system connecting device of the sixth aspect achieves the same effect of the device of the second aspect.

The system connecting device of the seventh aspect achieves the same effect of the device of the fourth aspect.

The system connecting device of the eighth aspect achieves the same effect of the device of the first aspect. Besides, since only one DC power supply is required, further miniaturization is achieved as compared with the system connecting device of the first aspect.

The system connecting device of the ninth aspect achieves the same effect of the device of the second aspect.

The system connecting device of the tenth aspect achieves the same effect of the device of the second aspect. Besides, since the first chopper circuit is a ringing choke type converter, source current ripple can be reduced.

The system connecting device of the eleventh aspect achieves the same effect of the device of the third aspect.

The system connecting device of the twelfth aspect achieves the same effect of the device of the fourth aspect.

It is thus an object of the present invention to resolve the conventional problems and to provide a system connecting device for converting DC power into AC power and supplying an AC power supply or an AC load with the AC power, the device being capable of establishing a ground for both DC and AC sides only with a few transistors and diodes without a transformer.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
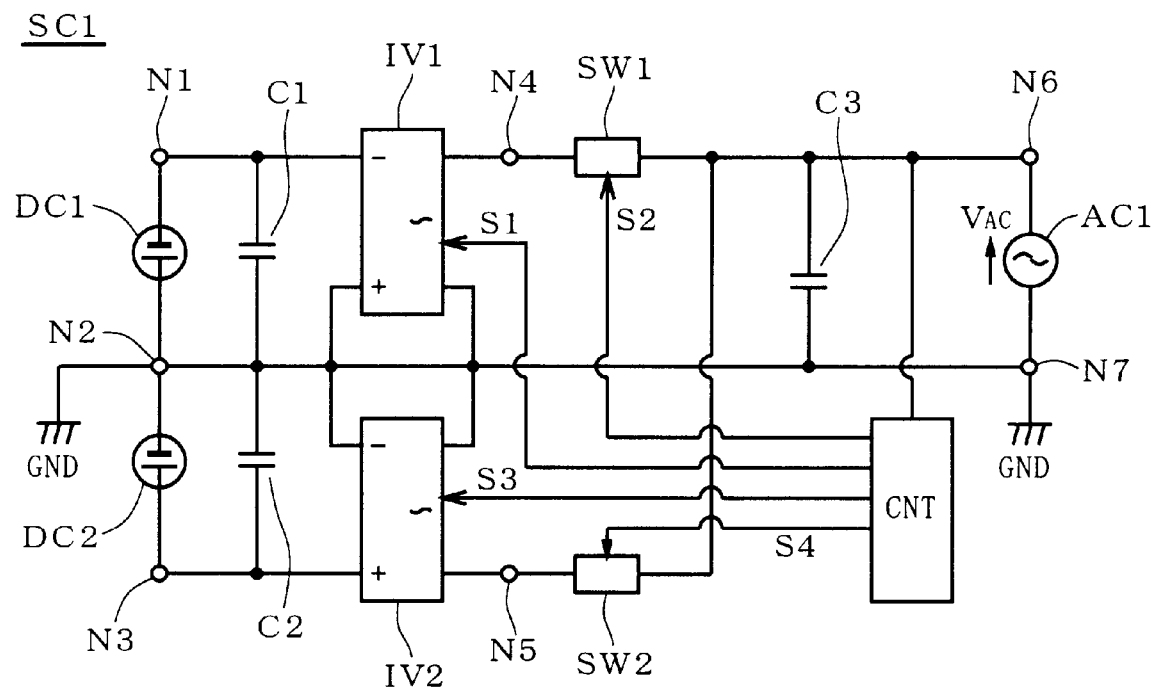
FIG. 1 shows a system connecting device according to a first preferred embodiment.

FIG. 1 shows a system connecting device SC1 according to a first preferred embodiment. The system connecting device SC1 comprises two solar cells DC1, DC2 and an AC power supply AC1 and has the function of supplying the AC power supply AC1 with DC powers generated by the solar cells DC1, DC2 on alternate half cycles of each AC cycle of the AC power supply AC1. For such an operation, the system connecting device SC1 comprises capacitors C1 to C3, inverters IV1 and IV2, and power synchronizing switches SW1 and SW2.

A positive electrode of the solar cell DC1 and a negative electrode of the solar cell DC2 are connected via a node N2 to ground, bearing a ground potential GND. A negative electrode of the solar cell DC1 is connected via a node N1 to one end of the capacitor C1, and a positive electrode of the solar cell DC2 are connected via a node N3 to one end of the capacitor C2. The other ends of the capacitors C1 and C2 are connected in common to the node N2.

The inverters IV1 and IV2 have two positive and negative DC input terminals and two AC output terminals. The inverter IV1 is connected at its negative DC input terminal to the node N1 and at its positive DC input terminal to the node N2. It is further connected at its one AC output terminal to one end of the power synchronizing switch SW1 via a node N4 and at its other AC output terminal to the node N2. The inverter IV2 is connected at its positive DC input terminal to the node N3 and at its negative DC input terminal to the node N2. It is further connected at its one AC output terminal to one end of the power synchronizing switch SW2 via a node N5 and at its other AC output terminal to the node N2.

The other ends of the power synchronizing switches SW1 and SW2 are connected via a node N6 in common to one end of the AC power supply AC1. The other end of the AC power supply AC1 is connected via a node N7 to ground. Further, the capacitor C3 is connected in parallel with the AC power supply AC1.

The inverters IV1 and IV2 have the functions of converting DC voltages generated by the solar cells DC1 and DC2, respectively, into AC voltages. More specifically, the inverters IV1 and IV2 converts the DC voltages generated by the solar cells DC1 and DC2 into positive and negative half-wave AC voltages for the AC power supply AC1, respectively, and then output those AC voltages from their AC output terminals on alternate half cycles. The power synchronizing switches SW1 and SW2 performs not only the function of transmitting the half-wave AC voltages generated by the inverters IV1 and IV2, respectively, to the AC power supply AC1 in accordance with the AC cycle of the AC power supply AC1, but also the function of, when one of the inverters is in operation, insulating the other from the AC power supply AC1.

Figure 2:
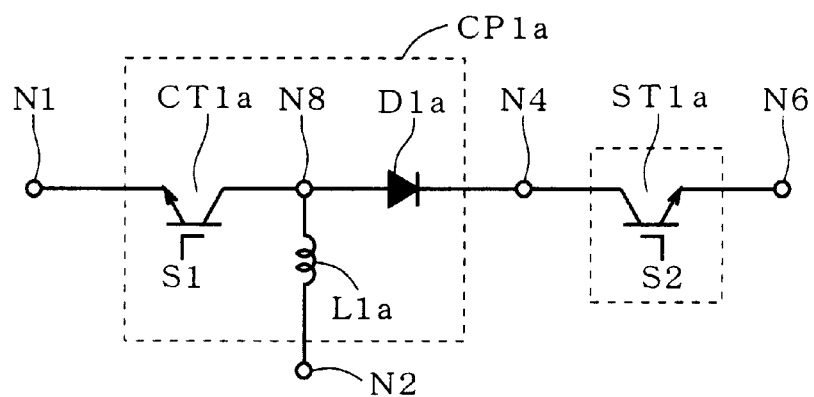
FIG. 2 specifically shows the structures of an inverter IV1 and a power synchronizing switch SW1 in the system connecting device of the first preferred embodiment.

As shown in FIG. 2, the inverter IV1 and the power synchronizing switch SW1 may for example be a buck-boost type chopper circuit CP1a and an insulated gate bipolar transistor ST1a, respectively. The buck-boost type chopper circuit CP1a functioning as the inverter IV1 includes an insulated gate bipolar transistor CT1a, a reactor L1a, and a diode D1a. The collector of the transistor CT1a is connected via a node N8 to one end of the reactor L1a and the anode of the diode D1a. The emitter of the transistor CT1a is connected to the node N1, and the cathode of the diode D1a is connected to the node N4. The other end of the reactor L1a is connected to the node N2, serving both as the positive DC input terminal and one of the AC output terminal of the inverter IV1. The transistor ST1a functioning as the power synchronizing switch SW1 is connected at its collector to the node N4 and at its emitter to the node N6. The transistors CT1a and ST1a receive at their gates control signals S1 (e.g., PWM signal) and S2 (e.g., signal in exclusive relations with S1) for generation of the AC voltage, respectively, from a control signal generator CNT.

Figure 3:
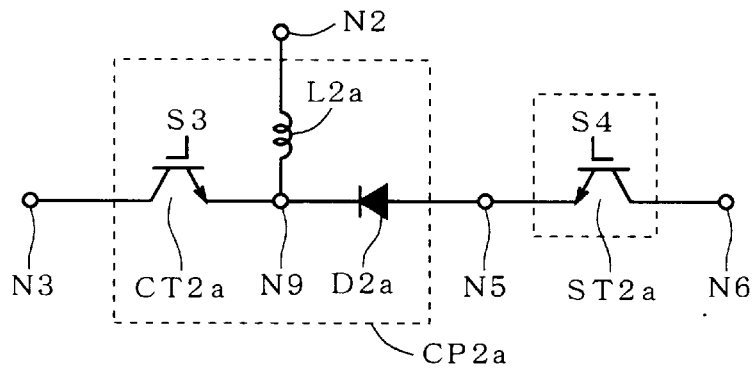
FIG. 3 specifically shows the structures of an inverter IV2 and a power synchronizing switch SW2 in the system connecting device of the first preferred embodiment.

Similarly as shown in FIG. 3, the inverter IV2 and the power synchronizing switch SW2 may for example be a buck-boost type chopper circuit CP2a and an insulated gate bipolar transistor ST2a, respectively. Like the inverter IV1, the buck-boost type chopper circuit CP2a functioning as the inverter IV2 also includes an insulated gate bipolar transistor CT2a, a reactor L2a, and a diode D2a. However, the polarity of the solar cell to be connected is opposite to that in the buck-boost type chopper circuit CP1a and the transistor ST1a, so that the connection of each element differs from the above case. More specifically, the emitter of the transistor CT2a is connected via a node N9 to one end of the reactor L2a and the cathode of the diode D2a. The collector of the transistor CT2a is connected to the node N3, and the anode of the diode D2a is connected to the N5. The other end of the reactor L2a is connected to the node N2, serving both as the negative DC input terminal and one of the AC output terminal of the inverter IV2. The transistor ST2a functioning as the power synchronizing switch SW2 is connected at its emitter to the node N5 and at its collector to the node N6. Like the inverter IV1 and the power synchronizing switch SW1, the transistors CT2a and ST2a receive at their gates control signals S3 (e.g., PWM signal) and S4 (e.g., signal in exclusive relations with S3) for generation of the AC voltage, respectively, from the control signal generator CNT.

Figure 4:
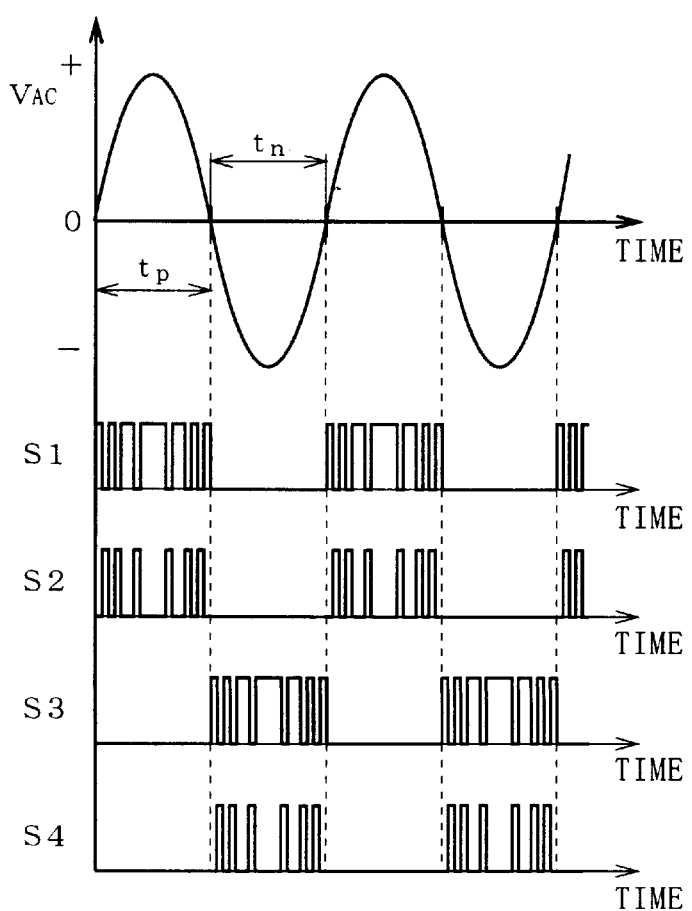
FIG. 4 shows the operation of the system connecting device of the first preferred embodiment.

Now, we will describe the operation of the system connecting device SC1. For example, where a supply of the power frequency AC voltage $V_{AC}$ having a sinusoidal wave form shown in FIG. 4 to the AC power supply AC1 is desired, control signals S1 to S4 may be applied as follows. When detecting a positive half cycle $t_p$ of the power frequency AC voltage $V_{AC}$, the control signal generator CNT generates the control signal S1 as a PWM signal corresponding to the power frequency AC voltage and the control signal S2 having exclusive relations with the control signal S1. The generator then applies those control signal S1 and S2 to the transistors CT1a and ST1a, respectively. The control signal S1 is repeatedly turned on/off at frequencies ten or more times as large as the output power frequency, whereby a duty factor gradually changes. When detecting a negative half cycle $t_n$ of the power frequency AC voltage $V_{AC}$, on the other hand, the control signal generator CNT generates the control signal S3 as a PWM signal corresponding to the power frequency AC voltage and the control signal S4 having exclusive relations with the control signal S3. The generator then applies those control signals S3 and S4 to the transistors CT2a and ST2a, respectively. This allows the inverters IV1 and IV2 to output the positive and negative half-wave voltages having a sinusoidal wave form, respectively, on alternate half cycles, whereby the AC power supply AC1 is supplied with the power frequency AC voltage $V_{AC}$. The capacitor C3 stores energy delivered from the inverter IV1 or IV2 as electrostatic energy, and further carries out the function of removing an unnecessary harmonic from the AC voltage $V_{AC}$ so that the waveform of the voltage $V_{AC}$ approaches the sine wave form. In FIG. 1, the direction of the arrow of the voltage $V_{AC}$ is positive since the output of the buck-boost type chopper is an inverted input signal.

In the above operation, more than one control signal (S1 to S4) is not outputted simultaneously. According to which of the control signals S1 to S4 is turned on, the operation of the circuit is in either of the following four operating modes:

Mode I (=when control signal S1 is on). When the transistor CT1a is on, the capacitor C1 and the solar cell DC1 which is an input power supply store electromagnetic energy in the reactor L1a. Energy stored in the capacitor C3 on the part of a load is passed not to the buck-boost type chopper circuit but to the AC power supply AC1 which is a load, by the presence of the diode D1a;

Mode II (=when control signal S2 is on). When the transistor CT1a is off and the transistor ST1a is on, the electromagnetic energy stored in the reactor L1a flows into the capacitor C3 and the AC power supply AC1 on the part of the load;

Mode III (=when control signal S3 is on). The operation is same as the mode I, except that the transistor C1a, the transistor ST1a, and the reactor L1a are replaced with the transistor C2a, the transistor ST2a, and the reactor L2a, respectively.

Mode IV (=when control signal S4 is on). The operation is same as the mode II, except that the transistor C1a, the transistor ST1a, and the reactor L1a are replaced with the transistor C2a, the transistor ST2a, and the reactor L2a, respectively, as in the mode III.

In addition to the function of smoothing out the output voltage of the solar cell DC1, the capacitor C1 has the function of, in the modes III and IV, accepting and charging current from the solar cell DC1 which is insulated from the inverter IV1 and storing output energy of the solar cell DC1 as electrostatic energy during the negative half cycle. Similarly, the capacitor C2 smoothes out the output voltage of the solar cell DC2 and stores output energy of the solar cell DC2 as electrostatic energy during the positive half cycle. The presence of these capacitors prevents decrease in utilization efficiency of the solar cells DC1 and DC2.

The use of the system connecting device according to the first preferred embodiment allows the supply of the ground potential GND to the solar cells DC1 and DC2 which are DC power supplies, and the AC power supply AC1. This improves stability and safety in the entire system connecting device. The device further improves its electric efficiency since there is no charge/discharge current in electrostatic capacity which is caused between the ground potential GND and a floating potential on the node N2 when the node N2 is not at the ground potential GND. Furthermore, the nonuse of the transformer prevents increase in weight and occupied volume of the entire system connecting device, and the nonuse of the single-phase bridge inverter reduces the necessary number of transistors and diodes.

In the first preferred embodiment, all transistors constituting the device are insulated gate bipolar transistors, but they may be other semiconductor devices having similar functions, such as an FET and a normal bipolar transistor.

Figure 5:
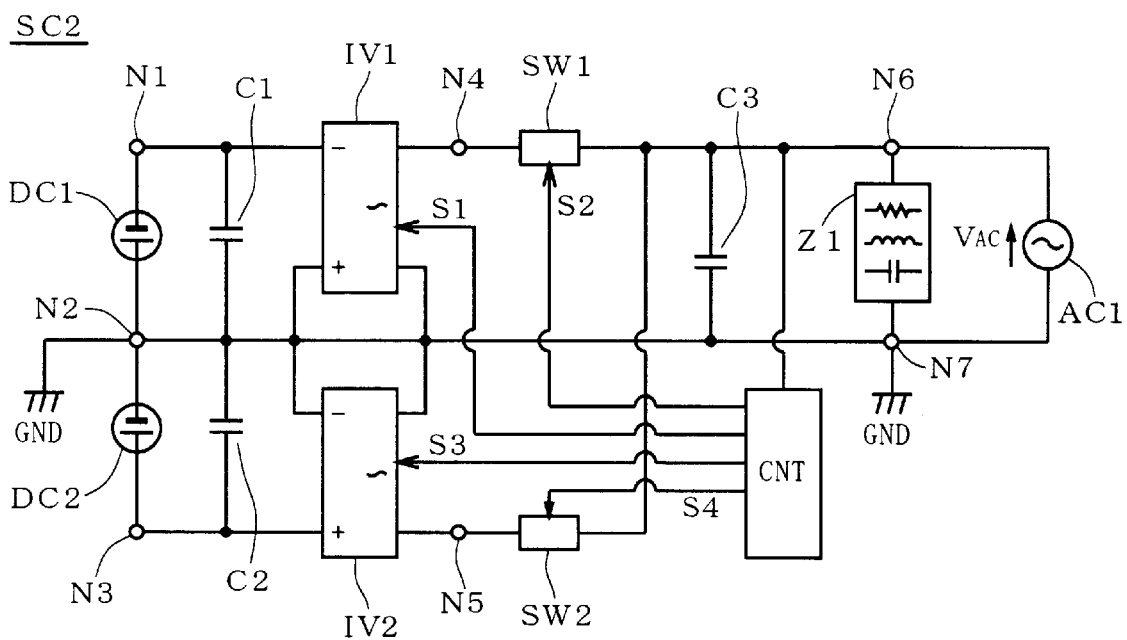
FIGS. 5 and 6 show modifications of the system connecting device of the first preferred embodiment.

Further, the device of the first preferred embodiment causes backflow of power with the AC power supply AC1 as a load, but by adding an AC load Z1 connected in parallel with the AC power supply AC1 as in a system connecting device SC2 of FIG. 5, the device may also be able to serve as an inverter-driving source while performing the backflow operation. Alternatively, only the AC load Z1 may be used as a load instead of the AC power supply AC1 of FIG. 1.

Figure 6:
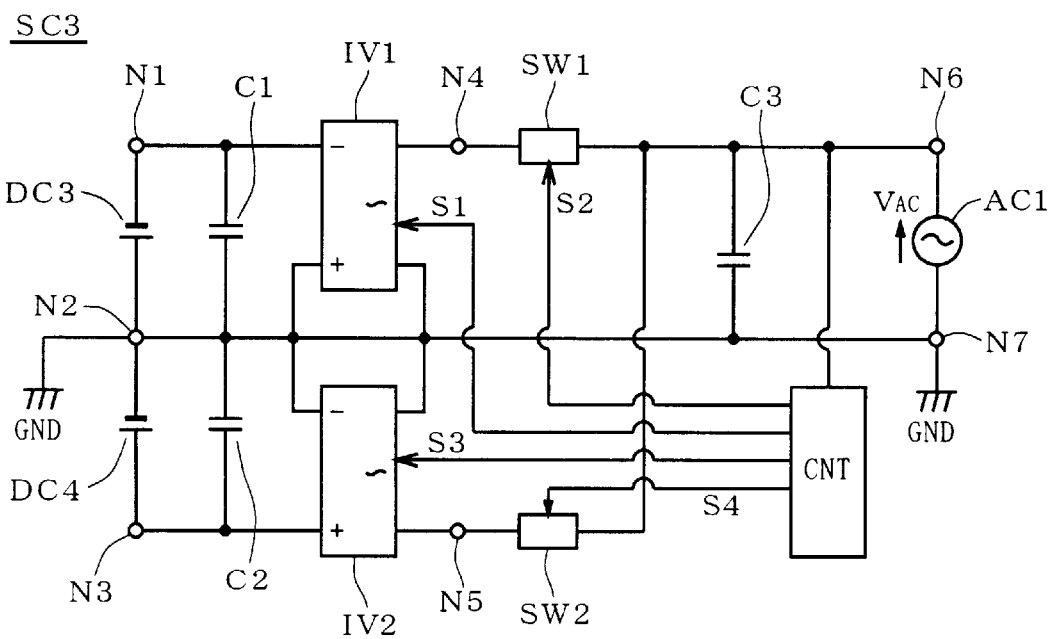

Furthermore, the DC power supplies of the first preferred embodiment are the solar cells DC1 and DC2, but as in a system connecting device SC3 shown in FIG. 6, they may be DC constant voltage sources DC3 and DC4 such as a normal battery.

2. Second Preferred Embodiment

A second preferred embodiment shows the system connecting device SC1 identical in structure to that of the first preferred embodiment, but only the control signals S2 and S4 applied to the transistors ST1$a$ and ST2$a$ are different.

Figure 7:
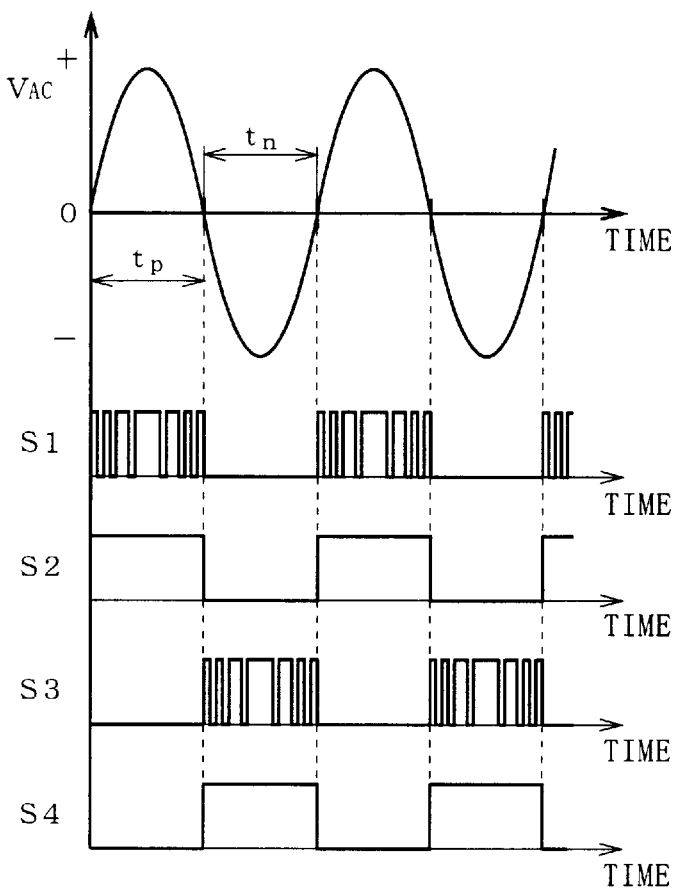
FIG. 7 shows the operation of a system connecting device according to a second preferred embodiment.

As shown in FIG. 7, signals employed as the control signals S2 and S4 do not have exclusive relations with the control signals (PWM signals) S1 and S3, but they are maintained in their on state throughout the entire positive or negative half cycle of the AC power supply AC1. Even with these signals, the operation of the device SC1 remains the same as that in the first preferred embodiment. If anything, the number of times the switching takes place is reduced, which reduces power loss and facilitates generation of the control signal S2 and S4.

The use of the system connecting device according to the second preferred embodiment reduces the number of times the control signals S2 and S4 are turned on/off as compared with the first preferred embodiment. This reduces power loss due to the switching and facilitates the control of the transistors ST1$a$ and ST2$a$.

3. Third Preferred Embodiment

Figure 8:
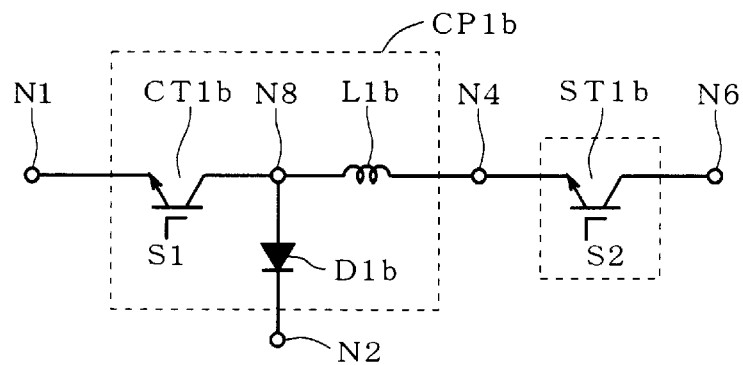
FIG. 8 specifically shows the structures of the inverter IV1 and the power synchronizing switch SW1 in a system connecting device according to a third preferred embodiment.
Figure 9:
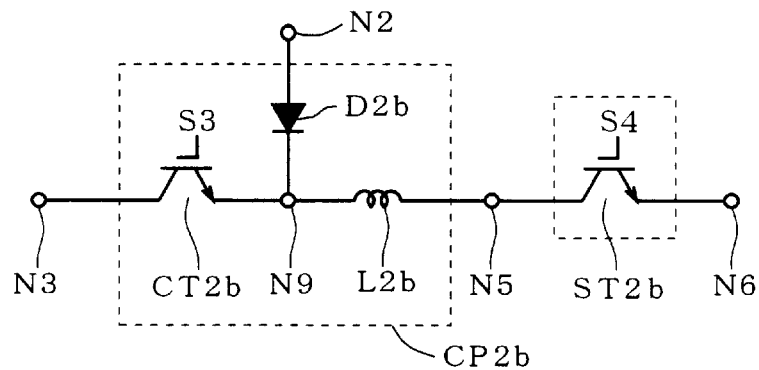
FIG. 9 specifically shows the structures of the inverter IV2 and the power synchronizing switch SW2 in the system connecting device of the third preferred embodiment.
Figure 10:
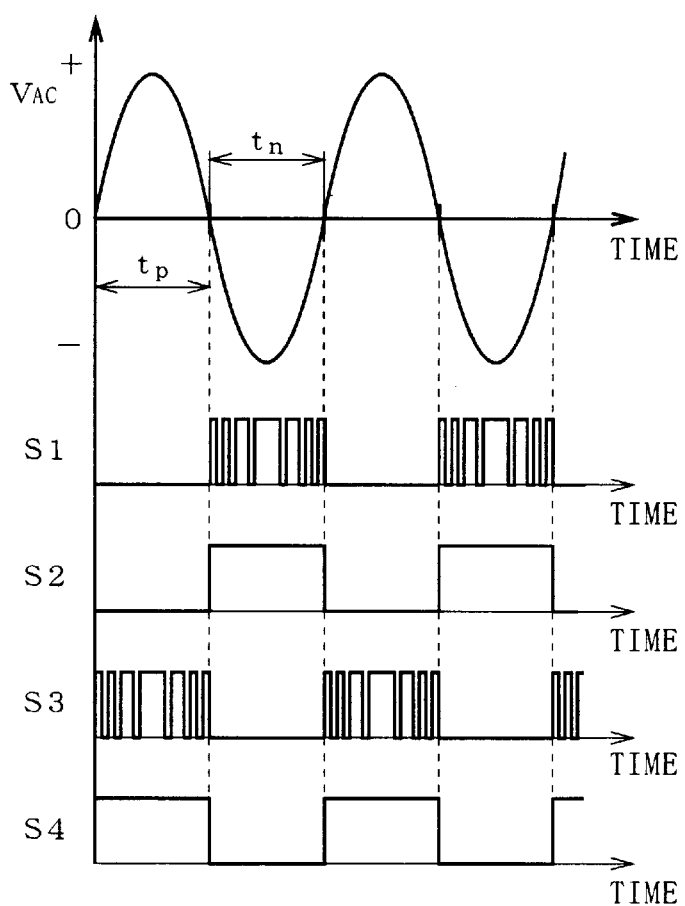
FIG. 10 shows the operation of the system connecting device of the third preferred embodiment.

A third preferred embodiment shows the system connecting device SC1 identical in structure to that of the first preferred embodiment, but as the inverters IV1 and IV2, buck type chopper circuits CP1$b$ and CP2$b$ shown in FIGS. 8 and 9 are employed instead of the buck-boost type chopper circuits CP1$a$ and CP2$a$ of FIGS. 2 and 3. Unlike the buck-boost type chopper circuit, the buck type chopper circuit outputs the input signal without changing the polarity thereof, so that the directions of transistors which are the power synchronizing switches SW1 and SW2 are different from those in the first and second preferred embodiments.

As shown in FIG. 8, the buck type chopper circuit CP1$b$ functioning as the inverter IV1 comprises an insulated gate bipolar transistor CT1$b$, a reactor L1$b$, and a diode D1$b$. The collector of the transistor CT1$b$ is connected via the node N8 to one end of the reactor L1$b$ and the anode of the diode D1$b$. The emitter of the transistor CT1$b$ is connected to the node N1 and the other end of the reactor L1$b$ is connected to the node N4. The cathode of the diode D1$b$ is connected to the node N2, serving both as the positive DC input terminal and one AC output terminal of the inverter IV1. The transistor ST1$b$ functioning as the power synchronizing switch SW1 is connected at its collector to the node N6 and at its emitter to the node N4. The transistors CT1$b$ and ST1$b$ receive at their gates the control signals S1 and S2, respectively, from the control signal generator CNT.

Similarly to the inverter IV1, the buck type chopper circuit CP2$b$ functioning as the inverter IV2 comprises, as shown in FIG. 9, an insulated gate bipolar transistor CT2$b$, a reactor L2$b$ and a diode D2$b$. However, the polarity of the solar cell to be connected is opposite to that in the inverter IV1 and the power synchronizing switch SW1, so that the connection of each element differs from the above case. More specifically, the emitter of the transistor CT2$b$ is connected via the node N9 to one end of the reactor L2$b$ and the cathode of the diode D2$b$. The collector of the transistor CT2$b$ is connected to the node N3 and the other end of the reactor L2$b$ is connected to the node N5. The anode of the diode D2$b$ is connected to the node N2, serving both as the negative DC input terminal and one of the AC output terminal of the inverter IV2. The transistor ST2$b$ functioning as the power synchronizing switch SW2 is connected at its emitter to the node N6 and at its collector to the node N5. Like the inverter IV1 and the power synchronizing switch SW2, the transistors CT2$b$ and ST2$b$ receive at their gates the control signals S3 and S4, respectively, from the control signal generator CNT.

Now, we will describe the operation of the system connecting device SC1 according to the third preferred embodiment. For example, where a supply of the power frequency AC voltage $V_{AC}$ having a sinusoidal wave form to the AC power supply AC1 is desired (as in the first preferred embodiment, the direction of the arrow in FIG. 1 is positive), the control signals may be applied as follows. In the negative half cycle $t_n$ of the power frequency AC voltage $V_{AC}$, the control signal generator CNT generates the control signal S1 as a PWM signal corresponding to the power frequency AC voltage and the control signal S2 which is maintained in its on state during the negative half cycle of each AC cycle of the AC power supply AC1. The generator then applies those control signal S1 and S2 to the transistors CT1$b$ and ST1$b$, respectively. In the positive half cycle $t_p$, on the other hand, the control signal generator CNT generates the control signal S3 as a PWM signal corresponding to the power frequency AC voltage and the control signal S4 which is maintained in its on state during the positive half cycle of each AC cycle of the AC power supply AC1. The generator then applies those control signals S3 and S4 to the transistors CT2$b$ and ST2$b$, respectively. This allows the inverter IV1 and IV2 to output the negative and positive half-wave voltages having a sinusoidal wave form, respectively, on alternate half cycles, whereby the AC power supply AC1 is supplied with the power frequency AC voltage $V_{AC}$.

As in the second preferred embodiment, signals employed as the control signals S2 and S4 do not have exclusive relations with the control signals (PWM signals) S1 and S3, but they are maintained in their on state throughout the entire negative or positive half cycle of each AC cycle of the AC power supply AC1. In the buck type chopper circuit, off-state transistors ST1$b$, ST2$b$ can neither store nor release electromagnetic energy in/to the reactor L1$b$, L2$b$. In this case, the circuit fails to serve as a chopper circuit. Therefore, the signals having exclusive relations with the control signals (PWM signals) S1 and S3 cannot be employed as the control signals S2 and S4.

The use of the system connecting device according to the third preferred embodiment allows the supply of the ground potential GND to the solar cells DC1 and DC2 which are DC power supplies, and the AC power supply AC1. This improves stability and safety in the entire system connecting device. The device further improves its electric efficiency since there is no charge/discharge current in the electrostatic capacity which is caused between the ground potential GND and the floating potential on the node N2 when the node N2 is not at the ground potential GND. Furthermore, the nonuse of the transformer prevents increase in weight and occupied volume of the entire system connecting device. The nonuse of the single-phase bridge inverter reduces the necessary number of transistors and diodes. Also, the reduced number of times that the control signals S2 and S4 are turned on/off, as compared with that in the first preferred embodiment, reduces power loss due to the switching and facilitates generation of the control signals S2 and S4.

In the third preferred embodiment as well as the first preferred embodiment, all transistors constituting the device may be other semiconductor devices having similar functions, such as an FET and a general bipolar transistor.

Further as in the first preferred embodiment, by adding the AC load Z1 connected in parallel with the AC power supply AC1 as in the system connecting device SC2 of FIG. 5, the device may also be able to serve as an inverter-driving source while performing the backflow operation. Alternatively, only the AC load Z1 may be used as a load instead of the AC power supply AC1. Still alternatively, the DC constant voltage sources DC3 and DC4 may be used as in the system connecting device SC3 shown in FIG. 6.

4. Fourth Preferred Embodiment

Figure 11:
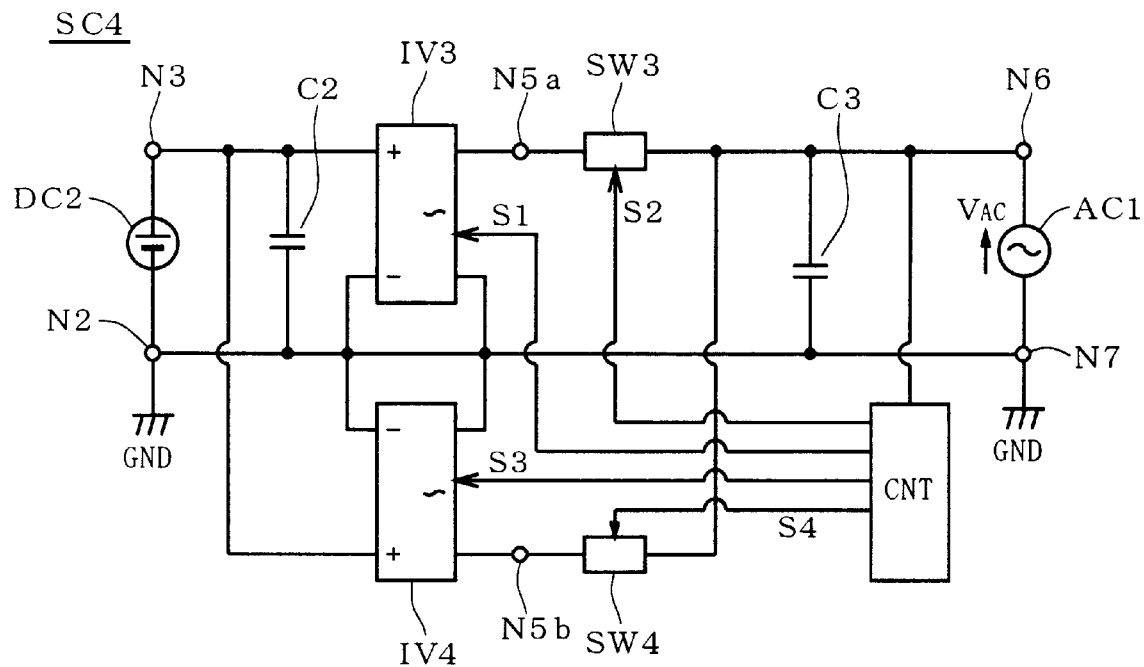
FIG. 11 shows a system connecting device according to a fourth preferred embodiment.

A fourth preferred embodiment shows a modification of the system connecting device SC1 shown in FIG. 1. FIG. 11 shows a system connecting device SC4 according to the fourth preferred embodiment. Unlike the system connecting device SC1, this system connecting device SC4 comprises only one solar cell and one capacitor. Comprising only one solar cell DC2 and one AC power supply AC1, the system connecting device SC4 has the function of supplying the AC power supply AC1 with DC power generated by the solar cell DC2 throughout the entire AC cycle of the AC power supply AC1. For such an operation, the system connecting device SC4 further comprises capacitors C2, C3, inverters IV3, IV4, and power synchronizing switches SW3, SW4.

A negative electrode of the solar cell DC2 is connected via the node N2 to ground, bearing the ground potential GND. A positive electrode of the solar cell DC2 is connected via the node N3 to one end of the capacitor C2. The other end of the capacitor C2 is connected to the node N2. The inverters IV3 and IV4 have two positive and negative DC input terminals and two AC output terminals. The inverter IV3 is connected at its negative DC input terminal to the node N2, at its positive DC input terminal to the node N3, at its one AC output terminal by a node N5a to one end of the power synchronizing switch SW3, and at its other AC output terminal to the node N2. The inverter IV4 is connected at its positive DC input terminal to the node N3, at its negative DC input terminal to the node N2, at its one AC output terminal by a node N5b to one end of the power synchronizing switch SW4, and at its other AC output terminal to the node N2. The other ends of the power synchronizing switches SW3 and SW4 are connected in common by the node N6 to one end of the AC power supply AC1. The other end of the AC power supply AC1 is connected via the node N7 to ground. Further, the capacitor C3 is connected in parallel with the AC power supply AC1.

The inverters IV3 and IV4 has the function of converting the DC voltage generated by the solar cell DC2 into AC voltage. More specifically, the inverters IV3 and IV4 convert the DC voltage generated by the solar cell DC2 into positive and negative half-wave AC voltages for the AC power supply AC1, respectively, and then output those AC voltages from their AC output terminals on alternate half cycles. The power synchronizing switches SW3 and SW4 perform not only the function of transmitting the half-wave AC voltages generated by the inverters IV3 and IV4 to the AC power supply AC1 in accordance with the AC cycle of the AC power supply AC1, but also the function of, when one of the inverters is in operation, insulating the other inverter from the AC power supply AC1.

For instance, the inverter IV3 and the power synchronizing switch SW3 may be the buck type chopper circuit CP2b and the transistor ST2b shown in FIG. 9, respectively (but the node N5 and the controls signals S3, S4 in FIG. 9 are replaced with the node N5a and the controls signals S1, S2, respectively).

Similarly, the inverter IV4 and the power synchronizing switch SW4 may be the buck-boost type chopper circuit CP2a and the transistor ST2a shown in FIG. 3, respectively (but the node N5 in FIG. 3 is replaced with the node N5b).

In this device, where a supply of the power frequency AC voltage $V_{AC}$ having a sinusoidal wave form as shown in FIG. 7 to the AC power supply AC1 is desired, for example, the control signals may be applied as follows. In the positive half cycle $t_p$ of the power frequency AC voltage $V_{AC}$, the control signal generator CNT generates the control signal S1 as a PWM signal corresponding to the power frequency AC voltage and the control signal S2 which is maintained in its on state during the positive half cycle of each AC cycle of the AC power supply AC1. The generator then applies those control signal S1 and S2 to the transistors CT2b and ST2b, respectively. In the negative half cycle $t_n$, on the other hand, the control signal generator CNT generates the control signal S3 as a PWM signal corresponding to the power frequency AC voltage and the control signal S4 which is maintained in its on state during the positive half cycle of each AC cycle of the AC power supply AC1. The generator then applies those control signals S3 and S4 to the transistors CT2a and ST2a, respectively. This allows the inverters IV3 and IV4 to output positive and negative half-wave voltages having a sinusoidal wave form, respectively, on alternate half cycles, whereby the AC power supply AC1 is supplied with the power frequency AC voltage $V_{AC}$. Here the direction of the arrow of the voltage $V_{AC}$ in FIG. 11 is positive.

Figure 12:
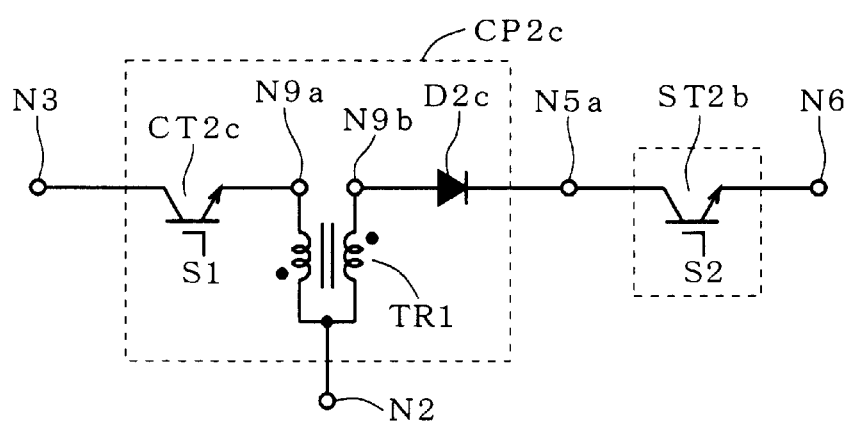
FIG. 12 specifically shows the structures of an inverter IV3 and a power synchronizing switch SW3 in the system connecting system of the fourth preferred embodiment.
Figure 13:
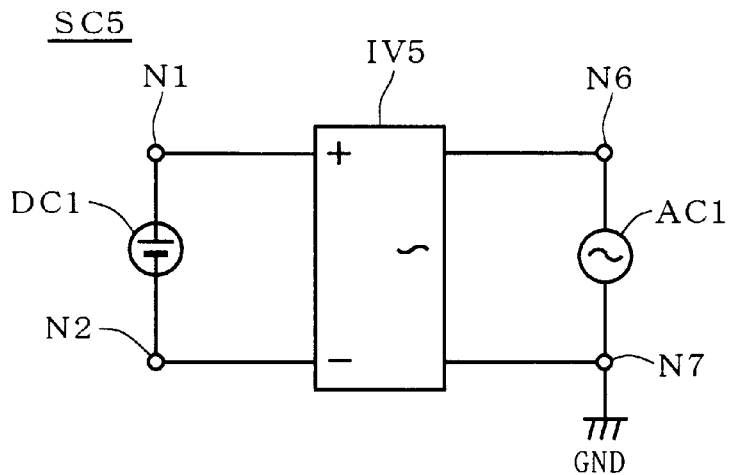
FIG. 13 shows a conventional system connecting device.
Figure 14:
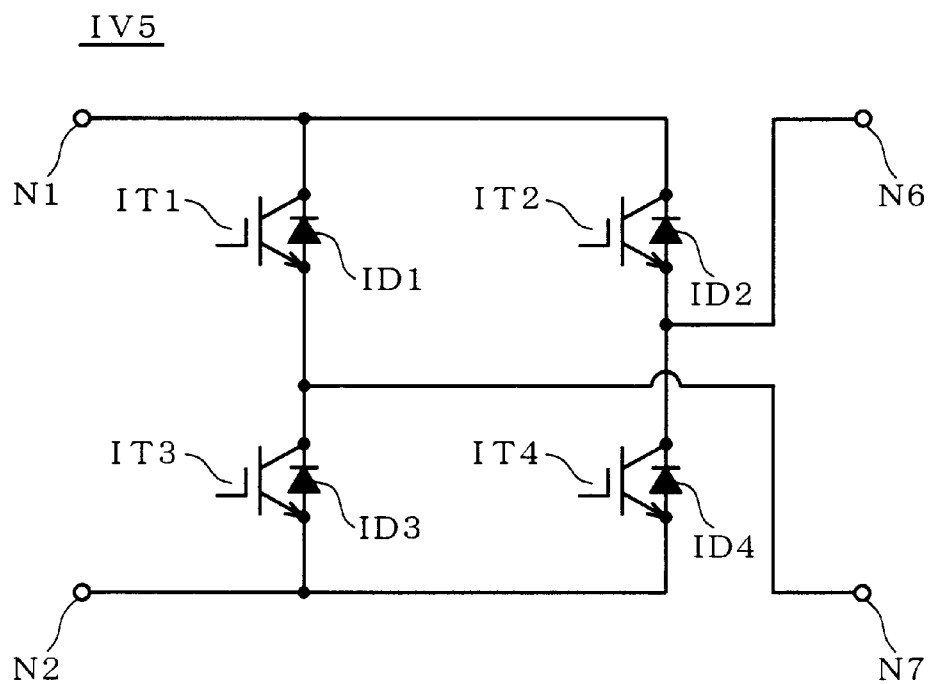
FIG. 14 specifically shows the structure of an inverter IV5 in the conventional system connecting device.
Figure 15:
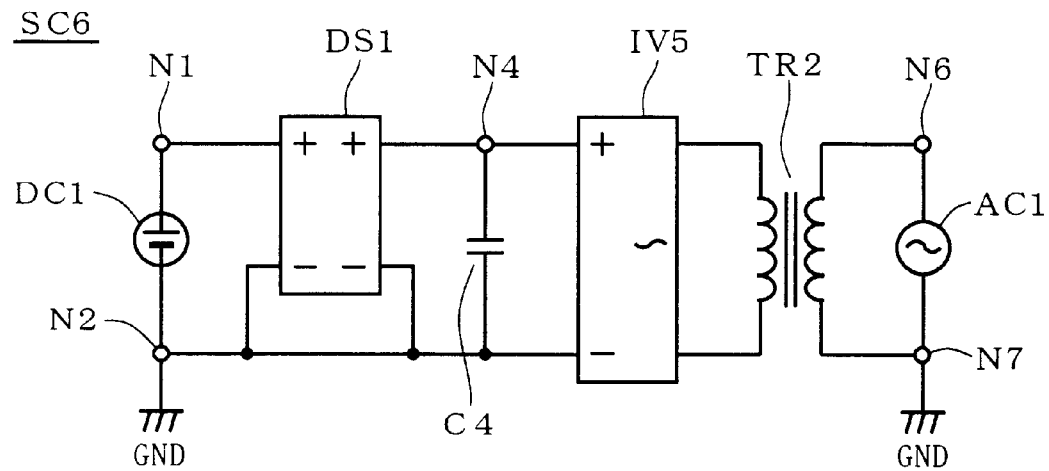
FIG. 15 shows another conventional system connecting device.
Figure 16:
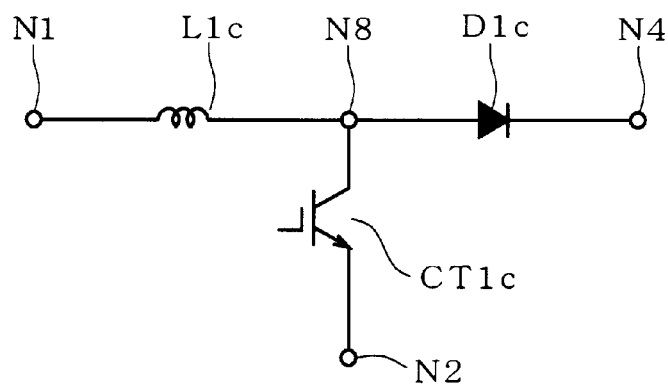
FIG. 16 specifically shows the structure of a DC voltage regulator DC1 in the conventional system connecting device.

Instead of the buck type chopper circuit CP2b, a ringing choke type converter CP2c shown in FIG. 12 may for example be employed as the inverter IV3. The ringing choke type converter CP2c comprises an insulated gate bipolar transistor CT2c, a transformer TR1, and a diode D2c. Although comprising the transformer TR1, the ringing choke type converter CP2c is considered to have an advantage of reduced source current ripple. Thus, as long as there is no harm in terms of weight and occupied volume, this converter is available for use as the inverter. The emitter of the transistor CT2c is connected via a node N9a to one end of the primary winding of the transformer TR1. The other end of the primary winding of the transformer TR1 is connected via the node N2 to one end of the secondary winding of the transformer TR1, serving both as the negative DC input terminal and one AC output terminal of the inverter IV3. The other end of the secondary winding of the transformer TR1 is connected via a node N9b to the anode of the diode D2c. The polarity of the primary and secondary winding of the transformer TR1 is set so that when a positive voltage is applied across nodes N9a and N2 on the primary winding, a positive voltage appears across the nodes N2 and N9b on the secondary winding. The collector of the transistor CT2c is connected to the node N3, and the cathode of the diode D2c is connected to the node 5a. The transistor ST2b functioning as the power synchronizing switch SW3 is, as in the buck type chopper circuit CP2b, connected at its collector to the node NSa and at its emitter to the node N6. The transistors CT2c and ST2b receives at their gates, as in the aforementioned case, the control signals S1 and S2 for AC voltage generation, respectively, from the control signal generator CNT. The use of the ringing choke type converter CP2c enables both operations of the control signals shown in FIGS. 4 and 7, which is impossible for the buck type chopper circuit CP2b.

In contrast to the system connecting device of the first preferred embodiment, the system connecting device of the fourth preferred embodiment requires only one solar cell and one capacitor, thereby reducing the number of elements. This results in miniaturization of the device.

In the fourth preferred embodiment as well as the first preferred embodiment, all transistors constituting the device may be other semiconductor devices having similar functions, such as an FET and a normal bipolar transistor.

Further as in the first preferred embodiment, by adding the AC load Z1 connected in parallel with the AC power supply AC1 as in the system connecting device SC2 of FIG. 5, the device may also be able to serve as an inverter-driving source while performing the backflow operation. Alternatively, only the AC load Z1 may be used as a load instead of the AC power supply AC1. Still alternatively, as in the system connecting device SC3 shown in FIG. 6, the DC constant voltage source DC4 may be used.

While the invention has been described in detail, the foregoing description is in all aspects illustrative and not restrictive. It is understood that numerous other modifications and variations can be devised without departing from the scope of the invention.

What is claimed is:

1. A system connecting device comprising:
    first and second DC power supplies each having positive and negative electrodes;
    an AC power supply having a first end, and a second end which is connected in common to said positive electrode of said first DC power supply and said negative electrode of said second DC power supply and to which a fixed potential is fed,
    said AC power supply applying an AC voltage of first frequency across said first and second ends thereof;
    a first chopper circuit for outputting first current which is obtained by chopping second current flowing through said negative electrode of said first DC power supply at a second frequency higher than said first frequency during a first half cycle in which said AC voltage is higher than said fixed potential;
    a first switch for supplying said first current during at least a period in which said first chopper circuit cuts off said second current in said first half cycle, said first switch stopping the supply during a second half cycle in which said AC voltage is lower than said fixed potential;
    a second chopper circuit for outputting third current which is obtained by chopping fourth current flowing through said positive electrode of said second DC power supply at a third frequency higher than said first frequency during said second half cycle; and
    a second switch for supplying said third current during at least a period in which said second chopper circuit cuts off said fourth current in said second half cycle, said second switch stopping the supply during said first half cycle of said AC voltage.

2. The system connecting device according to claim 1, wherein
    said first and second chopper circuits are both buck-boost type chopper circuits.

3. The system connecting device according to claim 2, wherein
    said first chopper circuit includes:
        a third switch having a first end connected to said negative electrode of said first DC power supply and a second end, said third switch being turned on/off at said second frequency;
        a first inductor having a first end connected to said second end of said third switch and a second end connected to said positive electrode of said first DC power supply; and
        a first diode having an anode connected to said second end of said third switch and a cathode connected to said first switch, and
    said second chopper circuit includes:
        a fourth switch having a first end connected to said positive electrode of said second DC power supply and a second end, said fourth switch being turned on/off at said third frequency;
        a second inductor having a first end connected to said second end of said fourth switch and a second end connected to said negative electrode of said second DC power supply; and
        a second diode having a cathode connected to said second end of said fourth switch and an anode connected to said second switch.

4. The system connecting device according to claim 3, wherein
    said third switch is turned on/off during said first half cycle, said third switch and said first switch being mutually exclusive; and
    said fourth switch is turned on/off during said second half cycle, said fourth switch and said second switch being mutually exclusive.

5. The system connecting device according to claim 1, wherein
    said first switch is on during said first half cycle and off during said second half cycle; and
    said second switch is off during said first half cycle and on during said second half cycle.

6. A system connecting device comprising:
    first and second DC power supplies each having positive and negative electrodes;
    an AC power supply having a first end, and a second end which is connected in common to said positive electrode of said first DC power supply and said negative electrode of said second DC power supply and to which a fixed potential is fed,
    said AC power supply applying an AC voltage of first frequency across said first and second ends thereof;
    a first chopper circuit for outputting first current which is obtained by chopping second current flowing through said negative electrode of said first DC power supply at a second frequency higher than said first frequency during a first half cycle in which said AC voltage is lower than said fixed potential;
    a first switch for supplying said first current during at least a period in which said first chopper circuit cuts off said second current in said first half cycle, said first switch stopping the supply during a second half cycle in which said AC voltage is higher than said fixed potential;
    a second chopper circuit for outputting third current which is obtained by chopping fourth current flowing through said positive electrode of said second DC power supply at a third frequency higher than said first frequency during said second half cycle; and a second switch for supplying said third current during at least a period in which said second chopper circuit cuts off said fourth current in said second half cycle, said second switch stopping the supply during said first half cycle of said AC voltage.

7. The system connecting device according to claim 6, wherein said first and second chopper circuits are both buck type chopper circuits.

8. The system connecting device according to claim 7, wherein said first chopper circuit includes:
- a third switch having a first end connected to said negative electrode of said first DC power supply and a second end, said third switch being turned on/off at said second frequency;
- a first inductor having a first end connected to said second end of said third switch and a second end connected to said first switch; and
- a first diode having an anode connected to said second end of said third switch and a cathode connected to said positive electrode of said first DC power supply, and said second chopper circuit includes:
- a fourth switch having a first end connected to said positive electrode of said second DC power supply and a second end, said fourth switch being turned on/off at said third frequency;
- a second inductor having a first end connected to said second end of said fourth switch and a second end connected to said second switch; and
- a second diode having a cathode connected to said second end of said fourth switch and an anode connected to said negative electrode of said second DC power supply.

9. The system connecting device according to claim 6, wherein:

said first switch is on during said first half cycle and off during said second half cycle; and said second switch is off during said first half cycle and on during said second half cycle.

10. A system connecting device comprising:

a DC power supply having positive and negative electrodes;

an AC power supply having a first end, and a second end which is connected to said negative electrode of said DC power supply and to which a fixed potential is fed, said AC power supply applying an AC voltage of first frequency across said first and second ends thereof;

a first chopper circuit for outputting first current which is obtained by chopping second current flowing through said positive electrode of said DC power supply at a second frequency higher than said first frequency during a first half cycle in which said AC voltage is higher than said fixed potential;

a first switch for supplying said first current during at least a period in which said first chopper circuit cuts off said second current in said first half cycle, said first switch stopping the supply during a second half cycle in which said AC voltage is lower than said fixed potential;

a second chopper circuit for outputting third current which is obtained by chopping said second current at a third frequency higher than said first frequency during said second half cycle; and a second switch for supplying said third current during at least a period in which said second chopper circuit cuts off said second current in said second half cycle, said second switch stopping the supply during said first half cycle of said AC voltage.

11. The system connecting device according to claim 10, wherein said first chopper circuit is a buck type chopper circuit; and said second chopper circuit is a buck-boost type chopper circuit.

12. The system connecting device according to claim 11, wherein said first chopper circuit includes:
- a third switch having a first end connected to said positive electrode of said DC power supply and a second end, said third switch being turned on/off at said second frequency;
- a first inductor having a first end connected to said second end of said third switch and a second end connected to said first switch; and
- a first diode having a cathode connected to said second end of said third switch and an anode connected to said negative electrode of said DC power supply, and said second chopper circuit includes:
- a fourth switch having a first end connected to said positive electrode of said DC power supply and a second end, said fourth switch being turned on/off at said third frequency;
- a second inductor having a first end connected to said second end of said fourth switch and a second end connected to said negative electrode of said DC power supply; and
- a second diode having a cathode connected to said second end of said fourth switch and an anode connected to said second switch.

13. The system connecting device according to claim 10, wherein said first chopper circuit is a ringing choke type converter; and said second chopper circuit is a buck-boost type chopper circuit.

14. The system connecting device according to claim 13, wherein said first chopper circuit includes:
- a third switch having a first end connected to said positive electrode of said DC power supply and a second end, said third switch being turned on/off at said second frequency;
- a first diode having an anode, and a cathode connected to said first switch; and
- a transformer including primary and secondary winding, said primary winding having a first end connected to said second end of said third switch and a second end connected to said negative electrode of said DC power supply, said secondary winding having a first end connected to said anode of said first diode and a second end connected to said negative electrode of said DC power supply, and said second chopper circuit includes:
- a fourth switch having a first end connected to said positive electrode of said DC power supply and a second end, said fourth switch being turned on/off at said third frequency;

an inductor having a first end connected to said second end of said fourth switch and a second end connected to said negative electrode of said DC power supply; and a second diode having a cathode connected to said second end of said fourth switch and an anode connected to said second switch.

15. The system connecting device according to claim 14, wherein said third switch is turned on/off during said first half cycle, said third switch and said first switch being mutually exclusive; and said fourth switch is turned on/off during said second half cycle, said fourth switch and said second switch being mutually exclusive.

16. The system connecting device according to claim 10, wherein said first switch is on during said first half cycle and off during said second half cycle; and said second switch is off during said first half cycle and on during said second half cycle.

* * * * *